United States Patent [19]

Hoshino et al.

[11] Patent Number: 4,839,677
[45] Date of Patent: Jun. 13, 1989

[54] FOCAL LENGTH SWITCHING TYPE CAMERA

[75] Inventors: Yasushi Hoshino, Tokyo; Masamori Makino, Hino, both of Japan

[73] Assignee: Konishiroku Photo Industry Co., Ltd., Tokyo, Japan

[21] Appl. No.: 20,148

[22] Filed: Feb. 26, 1987

Related U.S. Application Data

[62] Division of Ser. No. 860,646, May 7, 1986, Pat. No. 4,740,807.

[30] Foreign Application Priority Data

May 14, 1985 [JP] Japan .................................. 60-100382
May 14, 1985 [JP] Japan .................................. 60-100383

[51] Int. Cl.[4] ............................ G03B 5/00; G03B 7/26
[52] U.S. Cl. .................................... 354/195.1; 354/468
[58] Field of Search ................. 354/468, 484, 195.1, 354/195.12, 412

[56] References Cited

U.S. PATENT DOCUMENTS

| | | | |
|---|---|---|---|
| 4,502,774 | 3/1985 | Suzuki et al. | 354/468 X |
| 4,505,566 | 3/1985 | Noguchi | 354/195.12 X |
| 4,508,443 | 4/1985 | Matsuzaki et al. | 354/195.1 X |
| 4,544,249 | 10/1985 | Maemori et al. | 354/195.12 |
| 4,547,770 | 10/1985 | Suzuki et al. | 354/468 X |
| 4,597,657 | 1/1986 | Wakaboyashi | 354/195.12 |
| 4,740,807 | 4/1988 | Hoshino et al. | 354/412 |

FOREIGN PATENT DOCUMENTS 202828 11/1986 Japan ......................... 354/195.12

Primary Examiner—W. B. Perkey
Attorney, Agent, or Firm—Jordan B. Bierman; Bierman and Muserlian

[57] ABSTRACT

A focal length switching type camera wherein the focal length switching operation is initiated by a focal length switching and operating device, and a motor for driving a moving device is energized according to information from the focal length switching and operating device. The moving device moves a lens unit for holding a lens in a direction of an optical axis.

2 Claims, 5 Drawing Sheets

FOCAL LENGTH SWITCHING TYPE CAMERA

This application is a division of application Ser. No. 860,646, filed May 7, 1986, now U.S. Pat. No. 4,740,807.

BACKGROUND OF THE INVENTION

1. Field of the Invention

The present invention relates to a focal length switching camera capable of performing focal length switching even during photometric operation.

The present invention further relates to an electrically-operated focal length switching type camera in which a lens unit may be encased within a camera body even if a battery voltage is less than a normal value.

2. Description of the Prior Art

In the past, a lens exchange type camera in which a standard lens can be exchanged with a telephotolens having along focal length when a remote object is photographed in a large size, has been widely used. However, in this kind of camera, it is cumbersome to carry an exchange lens or replace a lens, and therefore, a camera in which two kinds of focal lengths may be switched by simple operation has been recently developed.

The two-focus camera of this kind encases therein two optical systems different in focal length from each other and in photographing, either optical system is selected by manual operation. The switching operation of the optical system becomes simpler as compared with prior art camera which involves cumbersome of lens exchange but this exchange requires a certain degree of time and therefore when a moving object is photographed, one might miss a shuttering chance, and it is difficult to switch the focal length while performing framing.

In view of the foregoing, the present inventors have proposed a two-focus camera in which a motor is started by operation of a button to move a lens unit thereby automatically switching the focal length.

In the focal length switching type camera of this kind, the focal length is sometimes switched while performing framing, and when a lens optical system is different, the brightness of the lens is different and therefore when it is switched to the long focal point side, a short in brightness sometimes results. It is therefore preferable that the focal length may be switched while performing photometric operation.

On the other hand, in recently available cameras, not only winding and unwinding of a film but even shutter driving and movement of a lens for focus adjustment are electrically or electromagnetically accomplished, and because of this, a consuming degree of a power source is extremely great. In the camera of this kind, when a voltage of the battery drops, the aforementioned various functions cannot be assured. Therefore, for assuring the performance of the camera, a battery voltage is checked and when the voltage lowers than the value of assuring the performance of the camera, a user is cautioned to urge replacement of a battery.

Incidentally, in a camera of the type in which the focal length is switched by moving an auxiliary lens unit into and out of a camera body, which is one type of the aforementioned two-focus camera, when the battery voltage lowers than the performance assurance value, i.e., the normal value, during the use of the camera in the state where the main lens unit is projected from the camera body (normal telephotographing), the lens unit driving mechanism becomes inoperative and the camera unit cannot be withdrawn into the camera body, and as the result the camera cannot be sometimes received into the case, which is inconvenient in handling.

SUMMARY OF THE INVENTION

The present invention has been accomplished in view of the foregoing and it is an object of the invention to provide a focal length switching type camera capable of switching at least two kinds of focal lengths, which can make good use of focal length switching. For achieving the aforesaid object, the camera according to the present invention is characterized in that even the depression operation in the first stage of the release, the focal length may be switched.

A further object of the invention is to provide a camera in which a lens unit is electrically moved into and out of a camera body to switch the focal length, wherein the readiness of use of the camera may be enhanced. For achieving the aforesaid object, the focal length switching type camera according to the present invention is characterized in that even if a battery voltage is lower than a normal value, a lens unit may be electromagnetically moved into the camera body.

DESCRIPTION OF THE PREFERRED EMBODIMENTS

Embodiments of the present invention will now be described with reference to the accompanying drawings.

Figure 1:
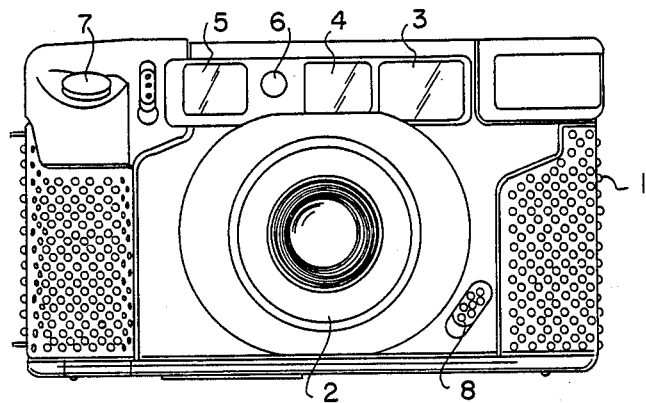
FIG. 1 is a front view of a focal length switching type camera according to the present invention.
Figure 2A:
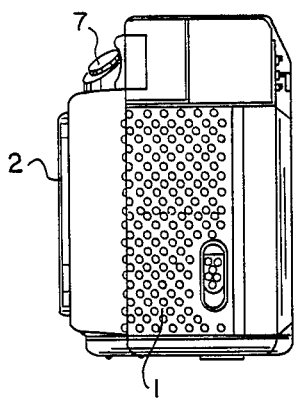
FIG. 2 (a) is a side view showing the depressed state of a lens-barrel of the camera, and FIG. 2 (b) is a side view showing the projected state of the lens-barrel of the camera.
Figure 2B:
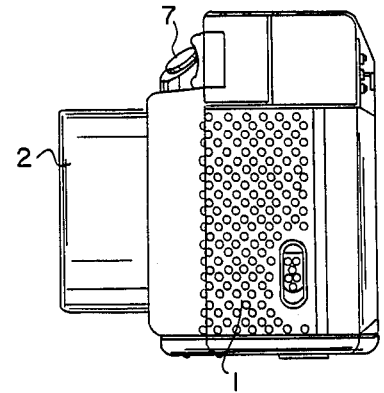

FIG. 1 is a front view of one embodiment of a two-focus camera in accordance with the present invention. FIGS. 2 (a) and 2 (b) are respectively side views of the camera when the latter has two kinds of focal length different from each other. The camera comprises a camera body 1, a lens-barrel 2 provided laterally movably in the front central portion of the body, a finder window 3, distance-measuring windows 4, 5, a light receiving element 6 such as CdS, and a release button 7 capable of performing two stage operations, wherein in the first stage operation, the distance measurement, photometry, checking of battery, checking of position and correction of position of a lens-barrel or a lens unit described later and the like are performed, and in the second stage operation, the movement of the lens unit, driving of the shutter and the like are performed. Reference numeral 8 designates an automatically returning type focal length switching button. When this button 8 is depressed in a direction as indicated by the arrow, the lens-barrel 2, when the latter is in its encased state, is projected from the state of FIG. 2 (*a*) to its state of FIG. 2 (*b*), whereas the lens-barrel 2, when the latter is in its projected state, is incased from the state of FIG. 2 (*b*) to the state of FIG. 2 (*a*).

Figure 3:
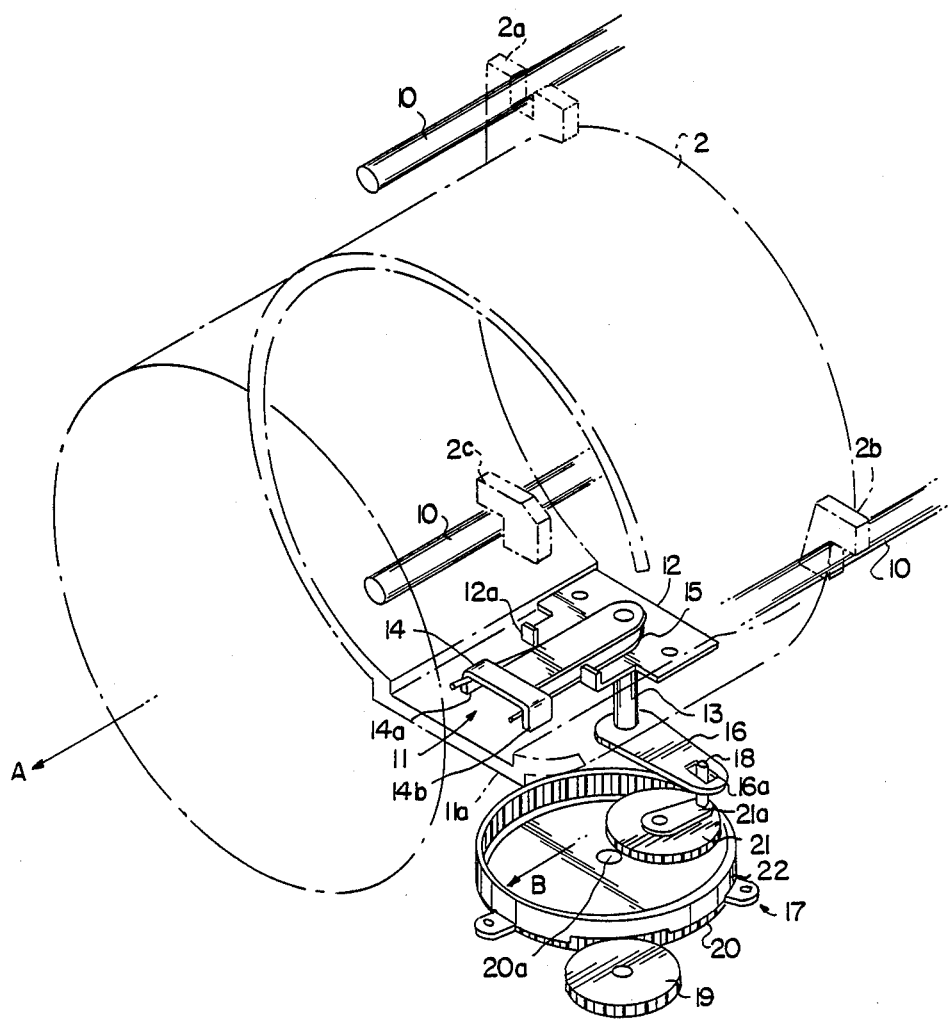
FIG. 3 is a perspective view showing the essential parts of a lens-barrel moving mechanism of the camera according to the present invention.

FIG. 3 shows a lens-barrel moving mechanism of the camera according to the present invention.

The lens-barrel 2 encases therein a lens unit, and projections 2a, 2b and 2c in the peripheral portion of the lens unit are engaged and supported on three guide shafts 10, respectively, provided on the camera body, whereby the lens unit may be moved in a direction as indicated by the arrow A while maintaining the axis thereof.

The lens-barrel 2 has a two-focus type photographing optical system incorporated therein which is moved straight forward in the direction of arrow A toward the camera body to thereby rearrange the structure of the optical system so that the focal length may be automatically switched.

The lens-barrel 2 is formed with a recess portion 11 by a flat diaphragm 11a in the peripheral surface of the bottom thereof to encase members of a driving-force transmission system for moving the lens-barrel 2.

More specifically, a plate 12 having symmetrical rising portions 12a, 12b is integrally secured by means of screws or the like to the upper surface of the diaphragm 11a, and a crank shaft 13 which extends through the plate 12 and the diaphragm 11a is rotatably mounted.

The crank shaft 13 is restricted from its axial movement by means of a control member not shown, and has a crank lever 14 secured thereto which has symmetrical descending portions 14a, 14b at a level slightly distanced from the plate 12.

Between the plate 12 and the crank lever 14 is incorporated a strong torsional spring 15 as a stroke absorbing member in a manner such that the spring 15 is loosely fitted in the crank shaft 13, and both ends of the spring are egaged by the rising portions 12a, 12b of the plate 12 and the descending portions 14a, 14b of the crank lever 14 so that the left and right portions thereof may be biased to receive the same strength. Accordingly, the crank lever 14 is in the form of an integral construction by the resilient action with respect to the plate 12, that is, the lens-barrel 2 whereby the crank lever 14 may not be turned in either left or right direction by a slight external force. These members are all encased within the space of the recess 11 and mounted so as not to interfere with the opticl system within the lens-barrel 2.

On the other hand, a crank arm 16 which is substantially at a right angle to the crank lever 14 is secured to the lower end of the crank shaft 13 projected externally of the diaphragm 11a, of the recess 11, and the crank arm 16 has a slot 16a with which engages a driving pin 18 as a driving member for the lens-barrel 2 operated by a planet gear mechanisn 17 provided within the camera body.

This planet gear mechanism 17 is composed of a large gear 20 rotated about a shaft 12a at a given position by means of a driving gear 19, a small gear 21 mounted on the large gear 20 and a fixed internal gear 22 meshed with the small gear 21. A driving pin 18 is provided on a plate 21a secured to the small gear 21.

According to the above described arrangement, the internal gear 22 has a pitch circle diameter twice that of the small gear 21 and the driving pin 18 is positioned on the pitch circle periphery. Therefore, While the large gear 20 rotates one half, the small gear 21 rotates one half about the internal gear 22 and revolves and at the same time the small gear 21 itself also rotates one half, whereby the pin 18 moves linearly in a direction as indicated by the arrow B to provide for the amount of movement corresponding to the pitch circle diameter of the internal gear 22 but the stroke thereof is set to the length capable of sufficiently covering the amount of movement of the lens-barrel 2.

In the lens-barrel moving mechanism designed as described above, the operation for switching the focal length of the lens-barrel 2 may be accomplished as follows:

When the driving gear 19 is rotated, for example, clockwise by the power of the motor (not shown), the large gear 20 is reduced in speed and begins its counterclockwise rotation. At that time, the small gear 21 also rotates together with the large gear 20 to turn the driving pin 18 counterclockwise along the circle but it meshes with the internal gear 22 and thereby simultaneously rotates on its axis clockwise, as a consequence of which the driving pin 18 begins its linear movement in the direction of arrow B.

Thus, the driving pin 18 is to add the clockwise turning force to the crank arm 16, but the crank lever 14 is in the state integral with the lens-barrel 2 by the action of the strong torsional spring 15 thus failing to rotate the crank arm 16. After all, the crank pin 18 causes the lens-barrel 2 to move parallel to the direction of the arrow A from a predetermined one end position (barrel-depressed position).

Even after the above-described operation has continued and the large gear 20 has reached its half rotation and the lens-barrel 2 has moved to and stopped at the other position (projected position), the driving force continuously acts on the driving pin 18 to turn the crank lever 14 against the resilient action of the torsional spring 15, by which operation the driving pin 18 has completed the whole stroke operation and is ready for the succeeding returning operation.

On the other hand, also in the case where the driving pin 18 is moved in the direction opposite the direction of the arrow B by the continuous rotation, the strong torsional spring 15 also acts reversely on the crank lever 14 in a manner similar to the aforementioned case, and therefore it is possible to move the lens-barrel 2 parallel thereto to the predetermined one end position.

Even after the lens-barrel 2 has moved and stopped at the predetermined one end position, the planet gear mechanism 17 continues to be operated similarly to the previous case to turn the crank lever 14 counterclockwise against the resiliency of the torsional spring 15. Therefore, the driving pin 18 terminates its whole returning stroke and stops at the depressed position accurately.

Accordingly, in the state where the operation of the planet gear mechanism 17 stops, the driving pin 18 causes the crank lever 14 to bias in either clockwise or counterclockwise direction against the torsional spring 15 to maintain it in a slightly rotated state.

Figure 4:
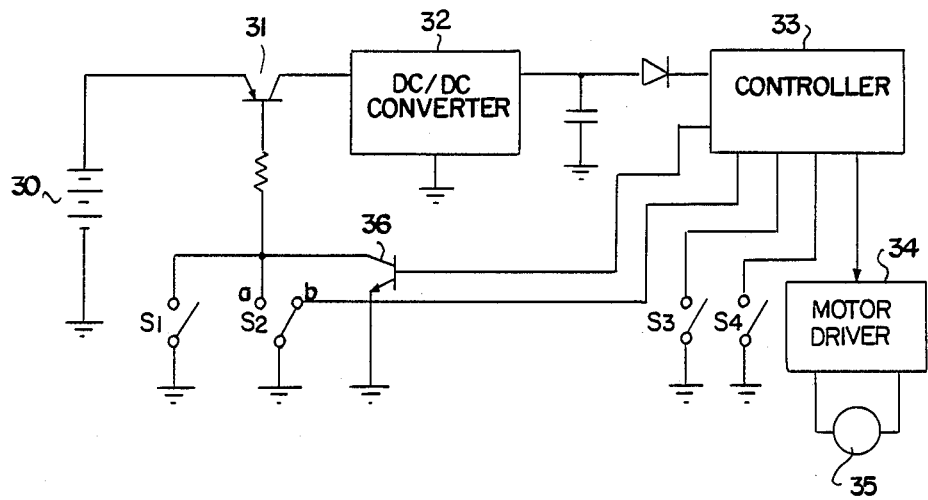
FIG. 4 shows the essential parts of an electric circuit of the camera according to the present invention.

FIG. 4 merely shows portions in connection with the driving of the lens-barrel moving mechanism of the camera according to the present invention, ommiting circuit portions in connection with normal measurement of distance, photometry, shutter and driving of the lens.

In FIG. 4, reference numeral 30 designates a battery; $S_1$, a release one-stage switch which is turned on when the release button 7 (see FIG. 1) is depressed one stage while it is being otherwise turned off; $S_2$, a focal length switching switch which is normally connected to a contact a but is switched to a contact b when it is turned on by the button 8 (see FIG. 1); 31, a transistor which comes into conduction when either switch $S_1$ or switch $S_2$ is turned on; 32, a boosting DC/DC converter; 33, a controller employing a micro-computer structure which puts out an operating command to the load of the camera according to data of distance measurement and photometry; and 34, a motor driver for driving a motor 35 for moving the lens-barrel 2 in accordance with the command from the controller 33. Reference numeral $S_4$ designates a state detection switch which cooperates with a part of the lens-barrel moving mechanism and which is turned off when the lens-barrel 2 is in a normal position on the short focus side or long focus side and it is turned on in other positions, and 36, a transistor for self-retaining the controller 33 when the switch $S_2$ assumes the contact b. $S_3$ is a release two-stage switch.

Figure 5:
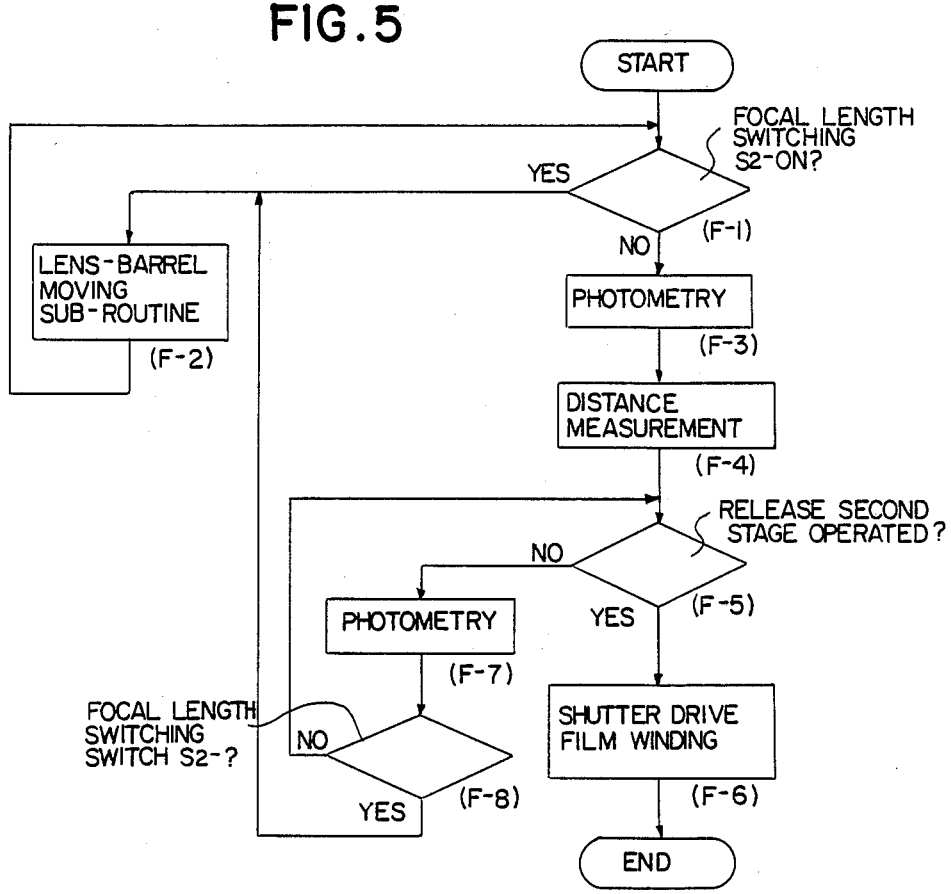
FIG. 5 is a flow chart showing the focal length switching operation of the camera according to the present invention.
Figure 6:
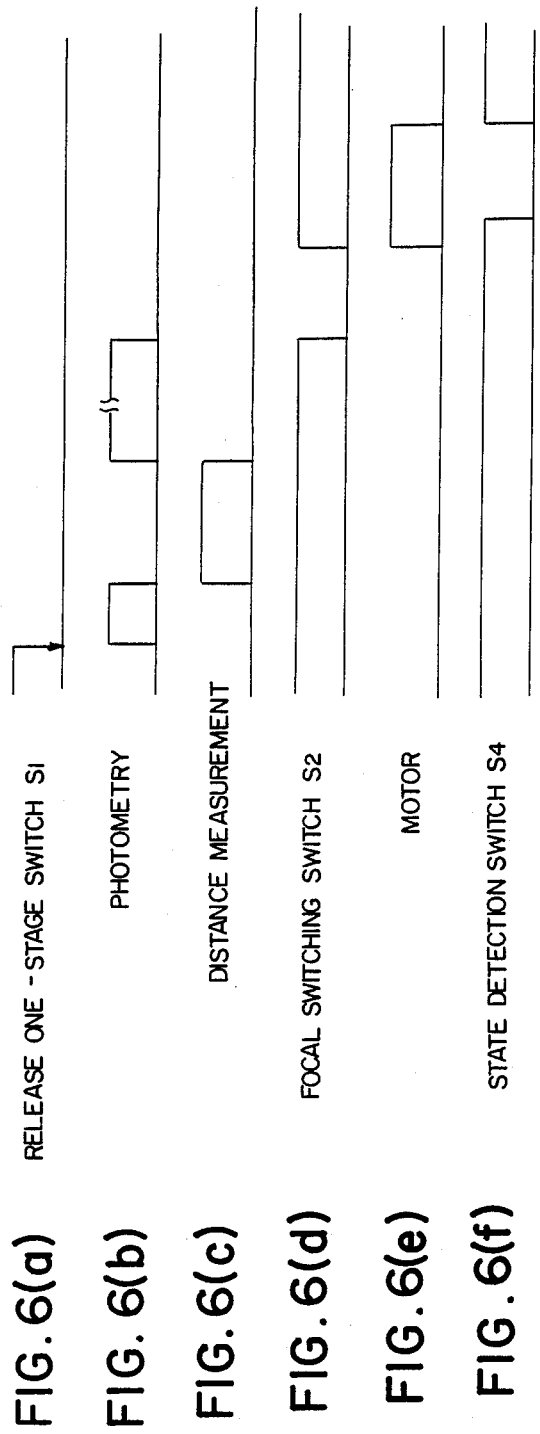
FIGS. 6 (a) to 6 (f) are respectively time charts for explanation of the focal length switching operation of the camera according to the present invention.

Next, the operation for switching the focal length of the camera according to the present invention will be described with reference to FIG. 5 and FIGS. 6 (a) to 6 (f).

This camera starts by turning on the release first stage switch $S_1$ and turning on the focal length switching switch $S_2$ (the switches being connected to the contact b).

First, the operation when the focal length is switched will be described.

When the switch $S_2$ is connected to the contact b, the controller 33 judges the focal length switching, that is, turning on switch $S_2$ (Step F-1), which proceeds to the lens moving sub-routine (F-2). In F-2, the motor is driven to move the lens to judge whether or not the lens-barrel 2 has reached the normal projected position or depressed position according to a signal from the switch $S_4$, and when the normal position is reached, the driving of the motor is stopped which includes the step for stopping the lens though not shown.

On the other hand, when the release one stage switch $S_1$ is turned on, the switch $S_2$ is in the off mode, which therefore proceeds to the photometric step F-3 and distance measuring step F-4. That is, the photometric operation (F-3) at timing shown in FIG. 6 (b) and consecutively the distance measuring operation (F-4) at timing shown in FIG. 6 (c) are carried out. Thereafter, judgement is made whether or not the release second stage operation caused by further depression of the relase button 8 (see FIG. 1) has been carried out (F-5). As a result, when the release second operation was carried out, a series photographing sequences such as driving of lens and shutter and film winding are carried out (F-6), and otherwise, the photometric operation is continued to judge whether or not the focal length switching operation has been carried out (F-8). Thereafter, if the focal length switching switch $S_2$ is turned on at timing shown in FIG. 6 (d), the operation proceeds to Step (F-2), where the motor 35 is driven at timing shown in FIG. 6 (e) whereby the lens-barrel 2 moves till it reaches the projected position or the depressed position. The state detection switch $S_4$ is in the on position during movement of the lens-barrel 2 as shown in FIG. 6 (f) but is turned off when the lens-barel 2 has reached the normal projected position or depressed position. Then, when the release second stage switch is again turned on via the photometric step (F-3) and distance measuring step (F-4), the shutter driving film is wound to terminate the photographing operation. Thereafter, the operation is again returned to F-1 to repeat the distance measuring and photometric operations.

As described above, the present invention provides a camera capable of switching at least two kinds of focal length, in which the focal length switching can be done during the first stage operation of the lens and therefore the standard and telephotograph may be switched each other while carrying out the photometric operation thus enhancing the readiness of use during framing.

Figure 7:
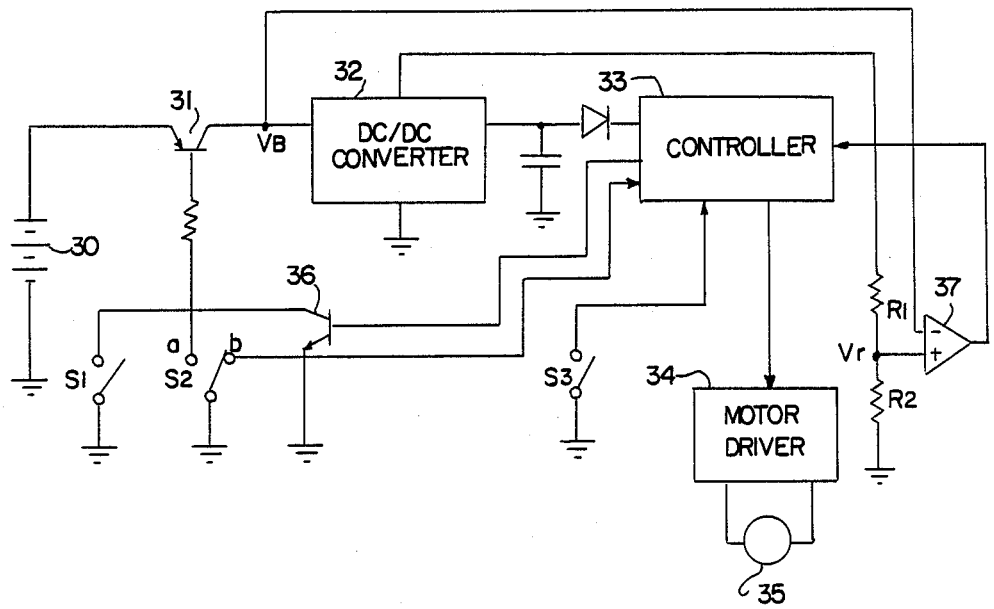
FIG. 7 shows the essential parts of an electric circuit of the camera according to another embodiment of the present invention.
Figure 8:
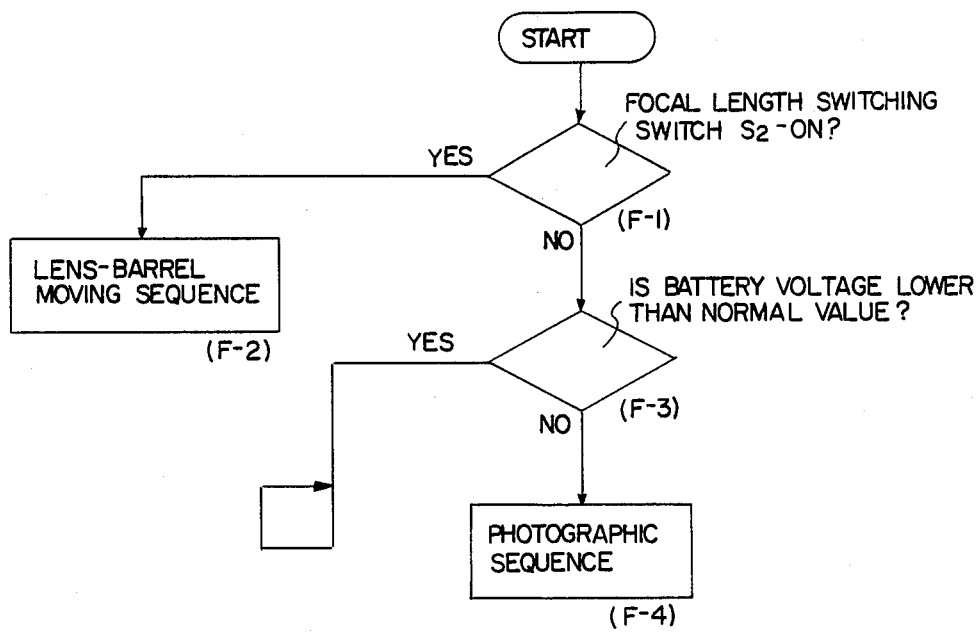
FIG. 8 is a flow chart of the focal length switching operation of the camera.

According to a further embodiment of the present invention, a comparator 37 for checking a battery voltage is provided as shown in FIG. 7. A reference voltage $V_r$ of the comparator 37 is prepared by dividing an output voltage of a DC/DC converter 32 by resistors $R_1$ and $R_2$.

The camera according to this embodiment starts by turning on the release one stage switch $S_1$ and focal length switching switch $S_2$ (the switches being connected to the contact b).

First, the operation when the focal length is switched will be described.

When the switch $S_2$ is connected to the contact b, the controller 33 judges the focal length switching, that is, turning on switch $S_2$ (Step F-1), which proceeds to the lens moving sequence (F-2) to move the lens.

The lens-barrel moving sequence (F-2) will be described in detail.

When the focal length switching button 8 is operated to switch the switch $S_2$ to the contact b, the controller 33 turns on the transistor 36 and it self retained. Accordingly, even if the button 8 is released to move the switch $S_2$ away from the contact b, the controller 33 operates and the driving of the motor 35 is continued and the movement of the lens proceeds.

When the lens reaches the normal position of the short or long focal point, the switch $S_3$ is turned off.

The controller 33 receives the signal to stop the motor 35 and turn off the transistor 37, as a consequence of which the circuit of FIG. 7 becomes inoperative.

On the other hand, when the release one-stage switch $S_1$ was turned on, the switch $S_2$ is in the off mode, the operation proceeds to Step F-3 where whether or not the battery voltage is below the normal is judged. In Step F-3, the comparator 37 compares a voltage VB fed to the load with a reference voltage $V_r$, and when $VB \leq V_r$, the output of the comparator 37 is "H", which is therefore the Step for checking by the controller 33 that the battery voltage is below the normal value. If the battery voltage is above the normal value as the result of checking the battery voltage in Step (F-3), the operation proceeds to the normal photographing sequence, whereas if the voltage is below the normal value, the advance of program is locked during the depression of the release button 7 to release the release button 7 or when the battery is replaced, the operation is returned to the initial Step (F-1) and the aforesaid operation is repeated.

As may be understood from the above-discribed flow chart, the movement of the lens-barrel is carried out irrespective of the result of checking the battery, and therefore, if the driving voltage of the motor 35 is set to a level below the reference voltage $V_r$ of the battery-check, the lens-barrel 2 may be moved even if the battery voltage is below the normal voltage. Accordingly, the lens-barrel 2 in the projected state may be moved to the depressed position.

As described above, in this embodiment of the present invention, the lens unit may be moved to switch the focal length even when the battery voltage is below the normal value. Therefore, even if the battery voltage becomes lower than the normal value during the use of the camera in the state where the lens unit is projected from the camera body, the lens unit may be set into the camera body, thus providing for readiness of use.

What is claimed is:

1. In a focal length switching type camera comprising moving means for moving a lens unit for holding a lens in a direction of an optical axis, operating means for actuating said moving means, and control means for controlling the operation of said moving means, whereby the lens unit is moved by said moving means to change the focal length, the improvement characterized by comprising battery checking means for judging whether or not a voltage of a battery is lower than a predetermined reference voltage, wherein a driving voltage of a motor for driving said moving means is set to a voltage lower than the reference voltage of said battery checking means.

2. The camera as set forth in claim 1 wherein said battery checking means is actuated by the first stage operation of said release operating means.

* * * * *